(12) United States Patent
Chiang

(10) Patent No.: US 12,647,018 B2
(45) Date of Patent: Jun. 2, 2026

(54) POWER SUPPLY FULL-BRICK MODULE WITH INTERNAL INRUSH CURRENT LIMIT CIRCUIT

(71) Applicant: AES Global Holdings PTE Ltd., Singapore (SG)

(72) Inventor: Man Ho Chiang, Kowloon (HK)

(73) Assignee: AES Global Holdings PTE Ltd., Singapore (SG)

( * ) Notice: Subject to any disclaimer, the term of this patent is extended or adjusted under 35 U.S.C. 154(b) by 204 days.

(21) Appl. No.: 18/712,789

(22) PCT Filed: Nov. 24, 2021

(86) PCT No.: PCT/CN2021/132661
§ 371 (c)(1),
(2) Date: May 23, 2024

(87) PCT Pub. No.: WO2023/092313
PCT Pub. Date: Jun. 1, 2023

(65) Prior Publication Data
US 2025/0023447 A1 Jan. 16, 2025

(51) Int. Cl.
*H02M 1/42* (2007.01)
*H02M 1/00* (2006.01)
(Continued)

(52) U.S. Cl.
CPC ............. *H02M 1/007* (2021.05); *H02M 1/32* (2013.01); *H02M 1/4225* (2013.01);
(Continued)

(58) Field of Classification Search
CPC . H02M 1/4225; H02M 1/4241; H02M 1/4266
See application file for complete search history.

(56) References Cited

U.S. PATENT DOCUMENTS

| | | | | |
|---|---|---|---|---|
| 2015/0098254 A1* | 4/2015 | Brinlee | ............... | H02M 3/3376 |
| | | | | 363/21.02 |
| 2015/0198634 A1* | 7/2015 | Brinlee | ................. | G01R 31/28 |
| | | | | 324/72.5 |

(Continued)

FOREIGN PATENT DOCUMENTS

| | | |
|---|---|---|
| JP | 2000060147 A | 2/2000 |
| JP | 2012064430 A | 3/2012 |

OTHER PUBLICATIONS

International Search Report & Written Opinion for PCT Application No. PCT/CN2021/132661, mailed May 9, 2022; 14 pages.

(Continued)

*Primary Examiner* — Gary A Nash

(57) ABSTRACT

A power converter comprises a power conversion circuit and a housing. The power conversion circuit comprises a voltage input, a voltage output, a first DC-DC voltage converter, and a second DC-DC voltage converter coupled to the first DC-DC voltage converter via a converter output bus. A first capacitor terminal is coupled to a first rail of the converter output bus and an inrush circuit coupled to a second rail of the converter output bus and coupled to a second capacitor terminal. The housing comprises a length no greater than 117.3 mm. The second capacitor terminal is coupled to the second rail only via the inrush circuit.

20 Claims, 4 Drawing Sheets

(51) Int. Cl.
  *H02M 1/32* (2007.01)
  *H02M 3/00* (2006.01)
  *H02M 7/219* (2006.01)

(52) U.S. Cl.
  CPC ............. *H02M 3/003* (2021.05); *H02M 3/01* (2021.05); *H02M 7/219* (2013.01); *H02M 1/4241* (2013.01); *H02M 1/4266* (2013.01)

(56) References Cited

U.S. PATENT DOCUMENTS

| | | | |
|---|---|---|---|
| 2017/0117810 A1* | 4/2017 | Ghosh ................. | H02M 1/4241 |
| 2017/0133926 A1* | 5/2017 | Lin ..................... | H02M 1/4241 |
| 2021/0289655 A1 | 9/2021 | Valdes et al. | |

OTHER PUBLICATIONS

Morrison, David, "DC-DC Converters Deliver Better Performance for Distributed Power", Electronic Design, Penton Media, Cleveland, OH, US, vol. 48, No. 12, Jun. 12, 2000, 6 pages.
Pendergast, Dennis; "Modular Converters Speed Power Designs", Electronic Design, Penton Media, Cleveland, OH, US, vol. 46, No. 20, Sep. 1, 1998, 5 pages.
Radecker at al.; "Ballast-On-A-Chip Realistic expectation or technical delusion?", IEEE Industry Applications Magazine, IEEE Service Center, Piscataway, NJ, US, vol. 10, No. 1, Jan. 1, 2004; 11 pages.
Yamadaya, et al.; "Small-Size Boost Type DC-DC Converter with the Tiny Embedded Inductor," Telecommunications Energy Conference, 2008. INTELEC 2008. IEEE 30th International, IEEE, Piscataway, NJ, USA, Sep. 14, 2008; 5 pages.

\* cited by examiner

POWER SUPPLY FULL-BRICK MODULE WITH INTERNAL INRUSH CURRENT LIMIT CIRCUIT

CROSS-REFERENCE TO RELATED APPLICATIONS

This application is a 371 of and claims the benefit and priority of PCT/CN2021/132661 filed Nov. 24, 2021, the entire disclosure of which is incorporated herein by reference.

TECHNICAL FIELD

Aspects of the disclosure relate to power converters and more particularly to a power converter housed in a full-brick form factor module with internal inrush circuitry.

BACKGROUND

Switching power conversion systems convert electrical power to direct current (DC) energy from alternating current (AC) sources or from another DC source using one or more power switches. Common components used in such power conversion systems include rectifier bridges, power factor correction (PFC) circuits, DC-DC voltage converters, and the like.

FIG. 6 illustrates a block schematic diagram of a known power factor correction (PFC) module 600 useful in converting AC voltage to DC voltage. PFC module 600 may be, for example, a PFC module available from Advanced Energy Industries, Inc. such as Advanced Energy's Artesyn AIF06ZPFC series full-brick power factor correction module that accepts a wide 85 to 264Vac input and presents a unity power factor.

The PFC module 600 includes a voltage input 601 capable of receiving AC voltage from an AC voltage source 602 such as a power grid or receiving DC voltage from a DC voltage source (not shown). A full-wave bridge rectifier 603 coupled to the voltage input 601 is configured to rectify an AC voltage into a DC voltage. A PFC circuit 604 is coupled to receive the DC voltage output from the rectifier 603 and to boost the DC voltage to a higher value for supply to a PFC output bus 605. The PFC circuit 604 includes one or more switches (not shown) controllable by a controller 606 for boosting the DC voltage. The controller 606 is further coupled to an inrush circuit 607 including a controllable isolation component 608 (e.g., an optocoupler) coupled to an auxiliary transformer 609 for controlling inrush current in the PFC module 600. As shown, the return of the inrush circuit 607 is a floating circuit and is coupled to the positive line of the PFC output bus 605.

Housed within a full brick module, the AIF06ZPFC module 600 has a high conversion efficiency of 97.3%, provides a nominal non-isolated output voltage of 400Vdc, and has a power density of 395 W/in³. The AIF06ZPFC module 600, however, does not provide isolation between the voltage input 601 and the PFC output bus 605. Further, the PFC module 600 lacks a DC-DC voltage converter to convert the DC voltage output on the PFC output bus 605 to another, typically lower voltage.

OVERVIEW

In accordance with one aspect of the present disclosure, a power converter comprises a power conversion circuit and a housing within which the power conversion circuit is positioned. The power conversion circuit comprises a voltage input comprising a first input terminal and a second input terminal, a voltage output comprising a first output terminal and a second output terminal, a first DC-DC voltage converter coupled between the voltage input and the voltage output, and a second DC-DC voltage converter coupled to the first DC-DC voltage converter via a converter output bus and coupled to the voltage output. The power conversion circuit further comprises a first capacitor terminal coupled to a first rail of the converter output bus and an inrush circuit coupled to a second rail of the converter output bus and coupled to a second capacitor terminal. The housing comprises a length no greater than 117.3 mm., a width no greater than 61.5 mm., and a height no greater than 14.5 mm. The second capacitor terminal is coupled to the second rail only via the inrush circuit.

In accordance with another aspect of the present disclosure, a power supply comprises a power supply chassis having an interior volume, power conversion system housed within the interior volume, and a bulk capacitor coupled to the capacitor connection terminals. The power conversion system comprises a voltage input configured to receive an input voltage from a voltage source, a power factor correction (PFC) circuit configured to generate a first DC voltage based on the input voltage, and a resonant converter configured to generate a second DC voltage based on the first DC voltage. The power conversion system further comprises a voltage output configured to supply the second DC voltage to a load, a voltage bus coupled between the PFC circuit and the resonant converter, and a capacitor coupler coupled in series with an inrush circuit, wherein the capacitor coupler comprises a pair of capacitor connection terminals and wherein the series-coupled capacitor coupler and inrush circuit are coupled between first and second rails of the voltage bus. A control system is coupled to the inrush circuit and configured to control an inrush current via the inrush circuit. A length of the power supply chassis is no greater than 117.3 mm., a width of the power supply chassis is no greater than 61.5 mm., and a height of the power supply chassis is no greater than 14.5 mm.

BRIEF DESCRIPTION OF THE DRAWINGS

The drawings illustrate embodiments presently contemplated for carrying out the invention.

In the drawings.

Figure 1:
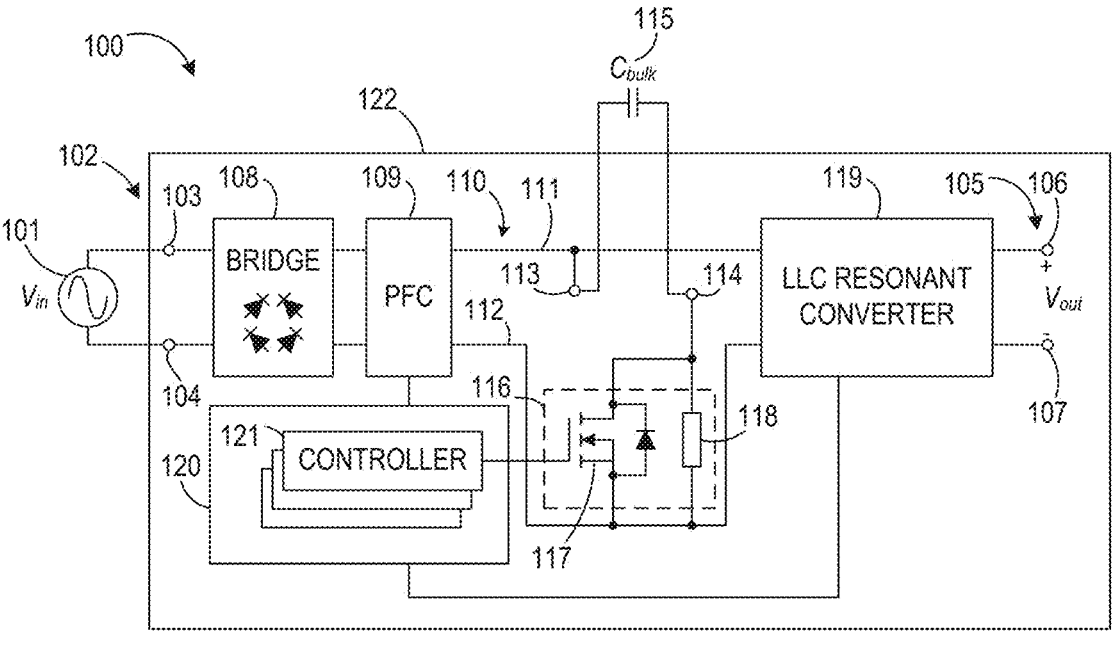
FIG. 1 illustrates a block diagram for an AC-DC power converter module according to an embodiment.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

FIG. 1 illustrates a schematic block diagram of a power converter 100 according to an embodiment. The power converter 100 receives a voltage such as an AC voltage from a voltage source 101 via a voltage input 102 having input terminals 103, 104 and converts the received voltage to a DC voltage for supply to a load via a voltage output 105 having output terminals 106, 107. An AC-DC converter such as a bridge rectifier 108 converts the input AC voltage to a DC voltage that is output to a power factor correction PFC converter 109 that boosts and supplies the DC voltage to a PFC output bus 110 having a positive bus rail or node 111 and a return bus rail or node 112. A pair of capacitor terminals 113, 114 (e.g., a capacitor coupler assembly) provide a connection for an external bulk capacitor 115 for the circuit. The first capacitor terminal 113 is coupled to the positive bus rail 111, while the second capacitor terminal 114 is coupled to the return bus rail 112 via an inrush circuit 116. The inrush circuit 116 includes a switch 117 and a resistor bank 118 having at least one resistor. A DC-DC converter 119 such as an LLC converter is coupled to the PFC output bus 110 and converts the DC voltage supplied by the PFC converter 109 to a second, typically lower, voltage for delivery to a load via the voltage output 105. The power converter 100 and the bulk capacitor 115 operate as a power supply to provide a converted power from the voltage source 101 to a load (not shown) coupled to the voltage output 105.

The power converter 100 also includes a control system 120 having one or more controllers 121 for controlling one or more switches in the power converters 109, 119. The single controller 121 shown in FIG. 1 represents the system of controllers that may be part of the PFC converter 109, the converter 119, and other controllers included in the power converter 100. The control system 120 controls one or more power switches (FIG. 3) in the PFC converter 109 for correcting a power factor. The control system 120 also controls switches (FIG. 4) in the resonant LLC power converter 119 for generating the output voltage.

As illustrated, a controller 121 is coupled to the switch 117, which is illustrated as a metal-oxide-semiconductor field-effect transistor (MOSFETs). In other embodiments, switch 117 may be a bipolar junction transistor (BJT), a relay, or other controllable switch. The controller 121 is configured to control the conduction state of the switch 117 to address inrush current during startup of the power converter 100. The controller 121 may control the switch 117 into is off or non-conduction mode during a first portion of time after an input voltage is applied to the input terminal 103. During the first portion of time, current flow through the bulk capacitor 115 and the inrush circuit 116 is directed through the resistor bank 118 to restrict its flow. After a predetermined time delay, in one example, the controller 121 controls the switch 117 into its on or conduction mode to direct the current flow to bypass the resistor bank 118. In another example, the controller 121 may sense the voltage or current via a sensor (not shown) at one or more nodes in the power converter 100 and control the switch 117 into its on or conduction mode in response to the sensed voltage or current passing a threshold value.

Figure 2:
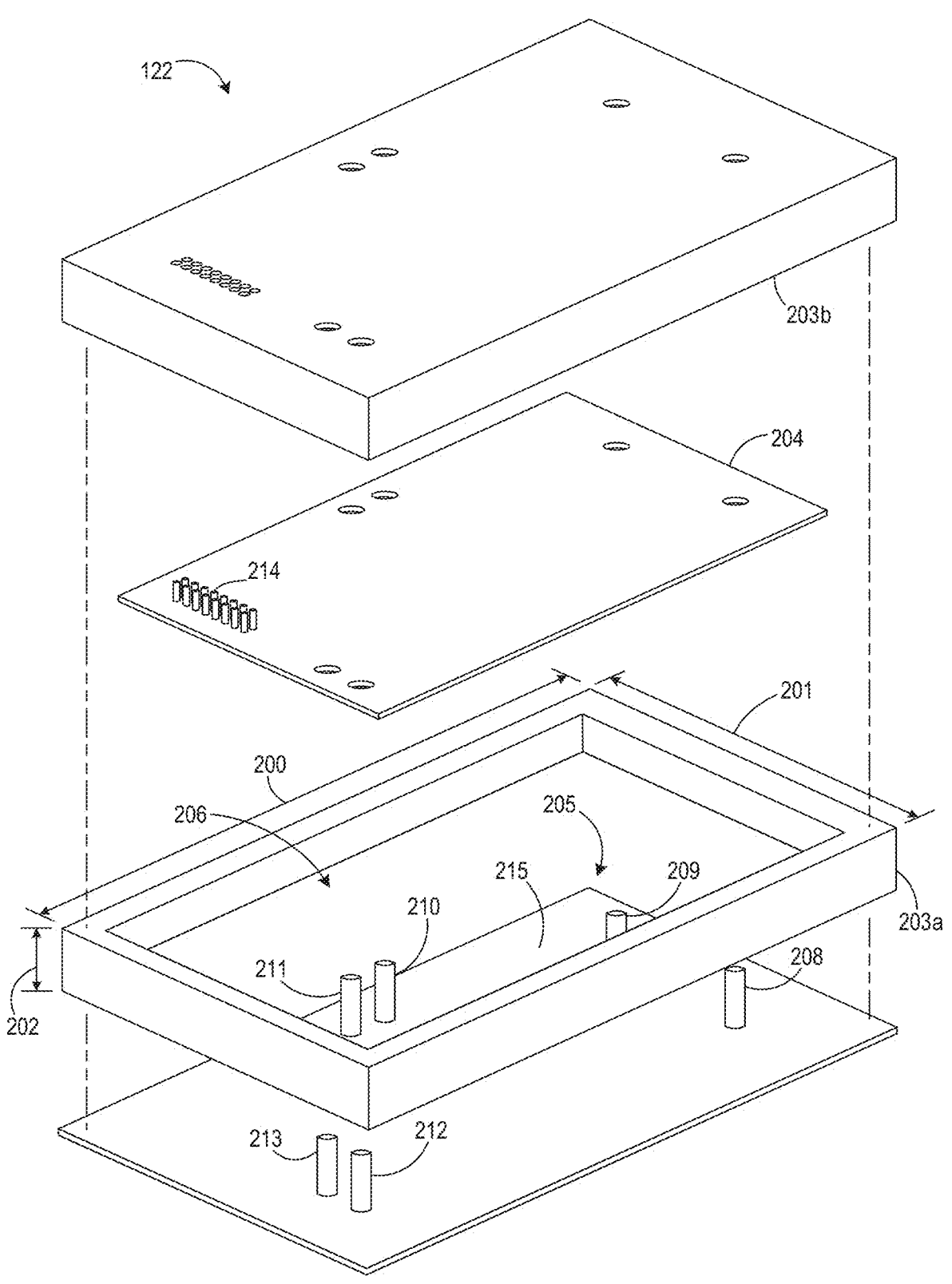
FIG. 2 illustrates a full-brick module housing according to an embodiment.

The power converter 100 is housed within a chassis or housing 122. Referring to FIG. 2, the housing 122 has a full-brick form factor having a length 200 no greater than 116.8 mm.+/−0.5 mm., a width 201 no greater than 61 mm.+/−0.5 mm., and a height 202 no greater than 14 mm.+/−0.5 mm. Accordingly, the length 200 is no greater than 117.3 mm., the width 201 is no greater than 61.5 mm., and the height is no greater than 14.5 mm. The housing 122 includes a case 203a, 203b that may be formed from an electrically conductive material or from an electrically insulative material such as plastic. One or more circuit boards such as control boards 204, 205 and support a plurality of electrical pins extending therefrom that provide external electrical connections to the power converter 100 housed within an interior volume 206 of the housing 122. Control board 205 includes a baseplate substrate 215. In one example, the baseplate 215 may be an insulated metal substrate board. The plurality of electrical pins includes a pair of input pins 208-209 coupled to the input terminals 103-104, a pair of bulk capacitor pins 210-211 coupled to the capacitor terminals 113-114, and a pair of output pins 212-213 coupled to the output terminals 106-107. Pins 208-213 are coupled to the baseplate 215. In addition, a plurality of signal pins 214 is provided to communicate signals to and from the power converter 100 and is coupled to the control board 204.

The incorporation of the inrush circuit 116 together with the other components of the power converter 100 of FIG. 1 within the full-brick housing 122 benefits from using high power, high temperature surge type surface-mount device (SMD) resistors as the resistors of the resistor bank 118. Additionally, the switch 117 of the inrush circuit 116 may be a high current density SMD MOSFET. The use of such SMD technology avoids the need for an external inrush circuit required in existing systems based on large size resistors such as wire-wound resistors, positive temperature coefficient (PTC) resistors, negative temperature coefficient (NTC) resistors, and the like.

Figure 3:
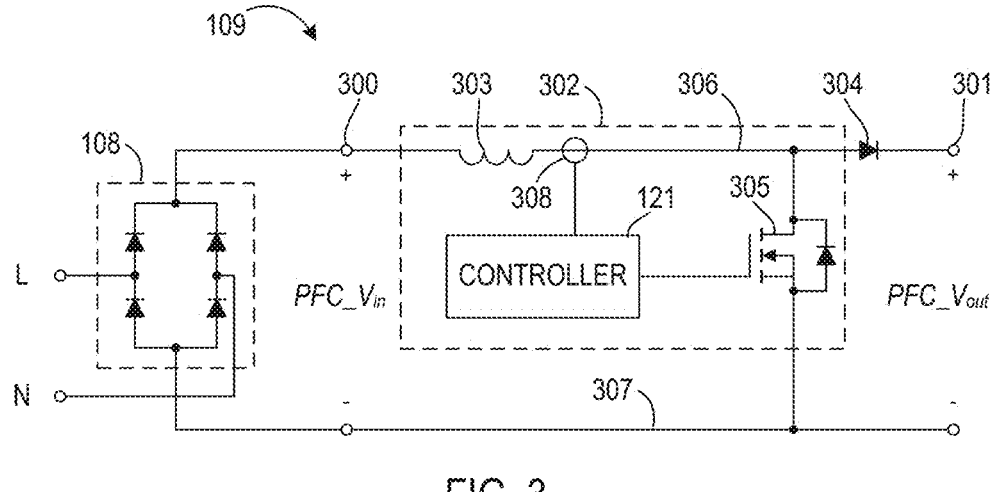
FIG. 3 illustrates a schematic diagram of a full-wave bridge and power factor correction circuit according to an embodiment.

FIG. 3 illustrates an exemplary schematic diagram of the bridge rectifier 108 and the PFC converter 109 of FIG. 1 according to an embodiment. The PFC converter 109 includes a DC voltage input 300 and a DC voltage output 301. The DC voltage input 300 is coupled to receive the DC output voltage from the bridge rectifier 108, and the DC voltage output 301 is coupled to the PFC output bus 110. Between the DC voltage input 300 and DC voltage output

301, a boost circuit 302 is configured to boost the input voltage and correct the power factor of the voltage to reduce harmonic distortion and reduce a phase shift between the voltage and current supplied to the power converter 100 (FIG. 1). The boost circuit 302 includes an inductor 303 coupled in series with a rectifying device (e.g., a diode) 304 between the DC voltage input and output 300, 301. A controllable power switch 305 (e.g., a MOSFET) is coupled between a positive voltage rail or node 306 coupling the inductor 303 in series with the diode 304 and a second voltage rail or node 307. Through appropriate control of the conduction and non-conduction modes of the switch 305, the boost circuit 302 boosts the DC input voltage on the DC voltage input 300 to a higher DC voltage for output by the DC voltage output 301.

A controller 121 of the control system 120 of FIG. 1 is coupled to the boost circuit 302 to control the conduction modes of the switch 305. The controller 121 is configured to control the switch 305 into conduction and non-conduction states to control the boost circuit 302 so that the inductor 303 works in the continuous mode, in the discontinuous mode, or at or near the boundary between the continuous mode and the discontinuous mode (e.g., in the critical conduction mode or boundary conduction mode).

In the continuous mode, the boost circuit 302 operates in two stages. During a first stage, current is generated in the inductor 303 in response to the switch 305 operating in a conduction state. During steady-state operation, the inductor current ideally grows linearly from a beginning current flow to a maximum current flow for the first stage. During a second stage in which the switch 305 is in a non-conduction state, the inductor current decreases linearly from the maximum current flow back beginning current flow. The beginning current flow is non-zero. In response to reaching the beginning current flow in the second stage, the first stage is again entered into and performed without delay in an example. The amplitude of the maximum current flow may be adjusted according to desired output voltage.

In the discontinuous mode, the boost circuit 302 operates in two stages. During the first stage, current is generated in the inductor 303 in response to the switch 305 operating in a conduction state. The inductor current ideally grows linearly from no current to a maximum current flow for the first stage. During the second stage in which the switch 305 is in a non-conduction state, the inductor current decreases linearly from the maximum current flow to zero current. After reaching the zero current, the switch 305 is in maintained in the non-conduction state for a delay period. The second stage is ended, and the first stage is again entered into and performed by again operating the switch 305 in the conduction state. The amplitude of the maximum current flow and/or the delay period may be adjusted to set the desired output voltage.

In the critical conduction mode, the boost circuit 302 operates in two stages. During a first stage, current is generated in the inductor 303 in response to the switch 305 operating in a conduction state. The inductor current ideally grows linearly from no current to a maximum current flow for the first stage. During a second stage in which the switch 305 is in a non-conduction state, the inductor current decreases linearly from the maximum current flow to zero current. In response to reaching zero current in the second stage, the first stage is again entered into and performed without delay in an example. The amplitude of the maximum current flow may be adjusted according to desired output voltage. A zero-cross detection signal may be provided to the controller 121 by a current sensor 308 for detecting the zero-current flow through the inductor 303.

Figure 4:
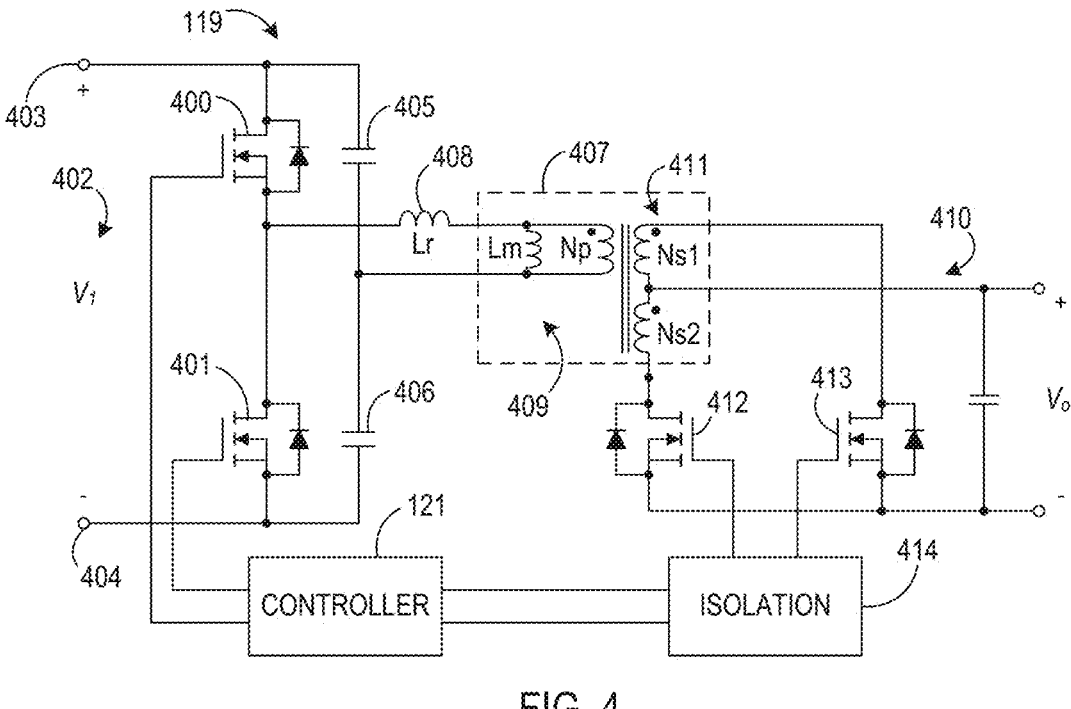
FIG. 4 illustrates a schematic diagram of resonant half-bridge LLC converter according to an embodiment.

FIG. 4 illustrates a circuit diagram for the LLC converter 119 of FIG. 1 according to an example. As shown, the LLC converter 119 is a resonant half-bridge LLC series converter. However, other resonant converters are contemplated such as a full-bridge LLC series converter, half- or full-bridge LCC converters, LC converters, and the like. The LLC converter 119 includes two power switches 400-401 coupled to a voltage input 402 having a pair of input terminals 403-404 configured to receive the DC output voltage present on the PFC output bus 110 (FIG. 1), two capacitors 405-406, a transformer 407, a resonant inductor 408 coupled to a primary side 409 of the transformer 407, and rectifying circuit 410 coupled to a secondary side 411 of the transformer 407. The capacitors 405-406, the inductor 408, and a magnetizing inductance (e.g., Lm) of the transformer 407 form the resonant LLC tank. The rectifying circuit 410 is shown as a full-wave rectifier including a pair of synchronous rectifier switches 412-413 coupled to a center-tapped secondary winding (e.g., Ns1, Ns2) of the transformer 407. In other configurations, the rectifying circuit 410 may include diodes in place of the synchronous rectifier switches 412-413. In yet other configurations, a full-wave bridge configuration including two pairs of synchronous rectifiers may be used.

As illustrated in FIG. 4, the controller 121 is coupled to control the power switches 400-401 on the primary side 409 of the LLC converter 119 using pulse-width modulation (PWM) signals in one implementation. The controller 121 (or another controller) is also configured to drive the power switches 400-401 through an isolation component 414 using PWM signals. In one example, the isolation component 414 may be an optocoupler, a transformer, or other isolation device.

Figure 5:
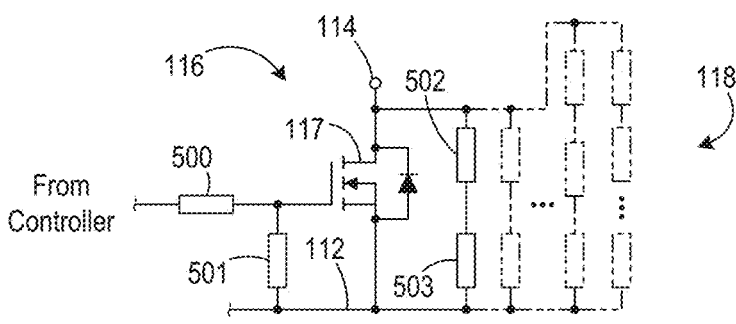
FIG. 5 illustrates a schematic diagram of the inrush circuit of FIG. 1 according to an embodiment.
Figure 6:
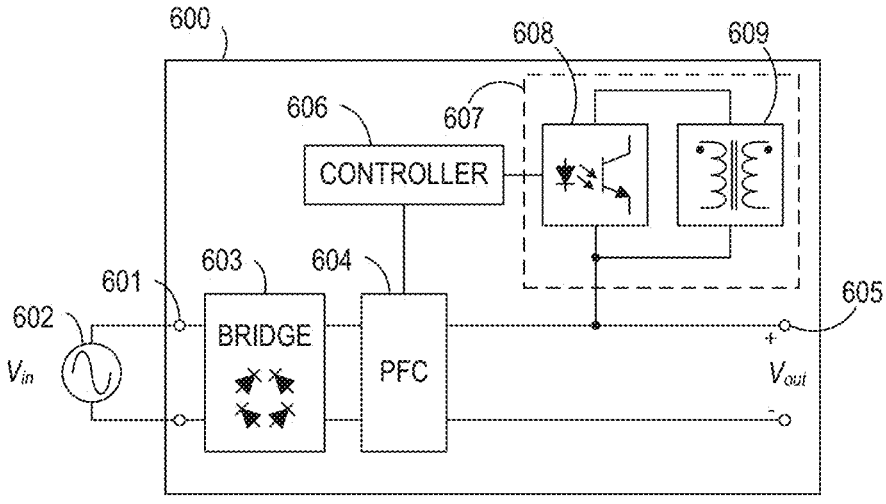
FIG. 6 illustrates a block schematic diagram of a known PFC module according to an example.

FIG. 5 illustrates a schematic diagram of the inrush circuit 116 of FIG. 1 according to an embodiment. Inrush circuit 116 includes a pair of resistors 500, 501 coupled to receive control signals from the controller 121 for controlling the switch 117 into conduction and non-conduction states. The resistor bank 118 may include a single resistor as illustrated in FIG. 1 or may include a plurality of resistors 502, 503, etc. coupled in series/parallel relationships as illustrated in FIG. 5. Two, three, or more resistors may be serially coupled in cash resistance path as shown.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the invention is not to be seen as limited by the foregoing description but is only limited by the scope of the appended claims.

What is claimed is:
1. A power converter comprising:
  a power conversion circuit comprising:
    a voltage input comprising a first input terminal and a second input terminal;
    a voltage output comprising a first output terminal and a second output terminal;

a first DC-DC voltage converter coupled between the voltage input and the voltage output;

a second DC-DC voltage converter coupled to the first DC-DC voltage converter via a converter output bus and coupled to the voltage output;

a first capacitor terminal coupled to a first rail of the converter output bus;

an inrush circuit coupled to a second rail of the converter output bus and coupled to a second capacitor terminal; and a housing within which the power conversion circuit is positioned;

wherein the housing comprises a length no greater than 117.3 mm.; and wherein the second capacitor terminal is coupled to the second rail only via the inrush circuit.

2. The power converter of claim 1, wherein the housing further comprises:

a width no greater than 61.5 mm.; and a height no greater than 14.5 mm.

3. The power converter of claim 2, wherein:

the length is no greater than 116.8 mm.+/−0.5 mm.;

the width is no greater than 61 mm.+/−0.5 mm.; and the height is no greater than 14 mm.+/−0.5 mm.

4. The power converter of claim 1, wherein the inrush circuit comprises:

a controllable switch coupled between the second capacitor terminal and the second rail; and a resistor bank comprising at least one resistor coupled between the second capacitor terminal and the second rail.

5. The power converter of claim 4, wherein the power conversion circuit further comprises a control system comprising a controller coupled to the controllable switch and configured to control the controllable switch into a conduction mode and into a non-conduction mode;

wherein, in the conduction mode, current flowing through the inrush circuit bypasses the resistor bank; and wherein, in the non-conduction mode, current flowing through the inrush circuit flows through the resistor bank.

6. The power converter of claim 5, wherein the controller is further configured to control the controllable switch from the non-conduction mode to the conduction mode after a delay period, the delay period beginning in response to a voltage introduced at the voltage input.

7. The power converter of claim 4, wherein the at least one resistor comprises:

a first resistor having a first terminal coupled with the second capacitor terminal and a second terminal; and a second resistor having a first terminal coupled with the second terminal of the first resistor and a second terminal coupled with the second rail.

8. The power converter of claim 1, wherein the first DC-DC voltage converter comprises a power factor correction (PFC) circuit.

9. The power converter of claim 1, wherein the housing comprises a full-brick form factor.

10. The power converter of claim 1, wherein the housing comprises:

a pair of input pins coupled to the first and second input terminals;

a pair of capacitor pins coupled to the first and second capacitor terminals; and a pair of output pins coupled to the first and second output terminals.

11. The power converter of claim 10, wherein the housing further comprises:

a case; and a baseplate;

wherein the pair of input pins, the pair of capacitor pins, and the pair of output pins extend from the baseplate and through the case.

12. A power supply comprising:

a power supply chassis having an interior volume;

a power conversion system housed within the interior volume and comprising:

a voltage input configured to receive an input voltage from a voltage source;

a power factor correction (PFC) circuit configured to generate a first DC voltage based on the input voltage;

a resonant converter configured to generate a second DC voltage based on the first DC voltage;

a voltage output configured to supply the second DC voltage to a load;

a voltage bus coupled between the PFC circuit and the resonant converter;

a capacitor coupler coupled in series with an inrush circuit, wherein the capacitor coupler comprises a pair of capacitor connection terminals and wherein the series-coupled capacitor coupler and inrush circuit are coupled between first and second rails of the voltage bus;

a control system coupled to the inrush circuit and configured to control an inrush current via the inrush circuit; and a bulk capacitor coupled to the capacitor connection terminals;

wherein a length of the power supply chassis is no greater than 117.3 mm.

13. The power supply of claim 12, wherein a width of the power supply chassis is no greater than 61.5 mm.; and wherein a height of the power supply chassis is no greater than 14.5 mm.

14. The power supply of claim 12, wherein the power supply chassis further houses a bridge rectifier coupled between the voltage input and the PFC circuit and configured to convert an AC voltage into a third DC voltage.

15. The power supply of claim 14, wherein the control system comprises at least one controller coupled to the PFC circuit and configured to control a switch of the PFC circuit to convert the third DC voltage into the first DC voltage; and wherein the first DC voltage is greater than the third DC voltage.

16. The power supply of claim 15, wherein the control system comprises at least one controller coupled to the resonant converter and configured to control a switch of the resonant converter to convert the first DC voltage into the second DC voltage; and wherein the second DC voltage is lower than the first DC voltage.

17. The power supply of claim 12, wherein power supply chassis comprises:

a case defining the interior volume;

one or more control boards enclosed within the interior volume; and a baseplate coupleable to the case to enclose the interior volume.

18. The power supply of claim 17, wherein power supply chassis comprises:

a pair of input pins extending from the baseplate and electrically coupled to the voltage input;

a pair of capacitor pins extending from the baseplate and electrically coupled to the capacitor coupler; and a pair of output pins extending from the baseplate and electrically coupled to the voltage output.

19. The power supply of claim 12, wherein the inrush circuit comprises:

a controllable switch coupled between the capacitor coupler and the second rail of the voltage bus; and a resistor bank coupled in parallel with the controllable switch and comprising at least one resistor.

20. The power supply of claim 19, wherein the control system comprises a controller configured to control the controllable switch between a non-conduction mode and a conduction mode to restrict inrush current flow through the bulk capacitor.

* * * * *